(12) United States Patent
Modarresi (10) Patent No.: US 8,986,405 B2
(45) Date of Patent: Mar. 24, 2015

(54) GAS GENERATOR AND PROCESSES FOR THE CONVERSION OF A FUEL INTO AN OXYGEN-DEPLETED GAS AND/OR HYDROGEN-ENRICHED GAS

(75) Inventor: Hassan Modarresi, Lyngby (DK)

(73) Assignee: Topsoe Fuel Cell A/S, Lyngby (DK)

( * ) Notice: Subject to any disclaimer, the term of this patent is extended or adjusted under 35 U.S.C. 154(b) by 987 days.

(21) Appl. No.: 12/958,147

(22) Filed: Dec. 1, 2010

(65) Prior Publication Data
US 2011/0146154 A1    Jun. 23, 2011

(30) Foreign Application Priority Data

Dec. 17, 2009    (EP) .................................... 09015643

(51) Int. Cl.
C01B 3/24    (2006.01)
C01B 3/32    (2006.01)
B01J 7/00    (2006.01)
(Continued)

(52) U.S. Cl.
CPC . *C01B 3/386* (2013.01); *C01B 3/48* (2013.01); *C01B 13/0281* (2013.01); *H01M 8/04223* (2013.01); *H01M 8/0612* (2013.01); *C01B 2203/0261* (2013.01); *C01B 2203/0283* (2013.01); *C01B 2203/04* (2013.01); *C01B 2203/0445* (2013.01); *C01B 2203/0465* (2013.01); *C01B 2203/047* (2013.01); *C01B 2203/066* (2013.01); *C01B 2203/0811* (2013.01); *C01B 2203/0822* (2013.01); *C01B 2203/0827* (2013.01); *C01B 2203/0883* (2013.01); *C01B 2203/1064* (2013.01); *C01B 2203/107* (2013.01); *C01B 2203/142* (2013.01); *C01B 2203/146* (2013.01); *C01B 2203/1685* (2013.01);
(Continued)

(58) Field of Classification Search
USPC ............... 48/127.1, 127.9, 61, 197 R, 198.7, 48/198.3, 198.1
See application file for complete search history.

(56) References Cited

U.S. PATENT DOCUMENTS 3,846,979 A * 11/1974 Pfefferle ......................... 60/774
4,033,133 A * 7/1977 Houseman et al. ............ 60/606
(Continued)

FOREIGN PATENT DOCUMENTS

CA    2 415 536 A1    6/2004
DE    198 60 308 A1    8/2000
(Continued)

*Primary Examiner* — Kaity Handal
(74) *Attorney, Agent, or Firm* — Dickstein Shapiro LLP (57) ABSTRACT

A gas generator and process for converting a fuel into an oxygen-depleted gas and/or hydrogen-enriched gas. The gas generator is preferably used for generating protection gas or reducing gas for start up, shut down or emergency shut down of a SOFC or SOEC. The process for converting fuel into oxygen-depleted gas and/or a hydrogen-enriched gas includes combusting the fuel in a primary catalytic burner with an oxygen-containing gas to produce a flue gas with oxygen, combusting or partially oxidizing the flue gas comprising oxygen with excess fuel in a secondary catalytic burner to produce a gas with hydrogen and carbon monoxide, and reducing the trace amounts of oxygen from the gas comprising traces of oxygen and obtaining an oxygen-depleted gas, or reducing the carbon monoxide present in the gas by conversion to carbon dioxide or methane to obtain a hydrogen-enriched gas.

3 Claims, 4 Drawing Sheets (51) Int. Cl.
*C01B 3/38* (2006.01)
*C01B 3/48* (2006.01)
*C01B 13/02* (2006.01)
*H01M 8/04* (2006.01)
*H01M 8/06* (2006.01)
*H01M 8/12* (2006.01)

(52) U.S. Cl.
CPC .... *C01B2203/82* (2013.01); *H01M 2008/1293* (2013.01); *Y02E 60/50* (2013.01); *Y02E 60/525* (2013.01)
USPC ....... 48/127.1; 48/197 R; 48/198.7; 48/198.3; 48/61; 48/76; 422/187; 422/600; 422/618; 422/625; 422/630; 422/631; 422/207

(56) References Cited

U.S. PATENT DOCUMENTS

| | | | |
|---|---|---|---|
| 4,111,848 A | 9/1978 | Torii et al. | |
| 4,522,894 A | 6/1985 | Hwang et al. | |
| 4,985,230 A | 1/1991 | Baden et al. | |
| 5,235,804 A * | 8/1993 | Colket et al. | 60/780 |
| 5,417,938 A | 5/1995 | Shelden et al. | |
| 5,536,699 A | 7/1996 | Ghelfi et al. | |
| 5,628,931 A | 5/1997 | Lednor et al. | |
| 5,733,514 A | 3/1998 | Boucot et al. | |
| 6,110,861 A | 8/2000 | Krumpelt et al. | |
| 6,383,468 B1 * | 5/2002 | Schussler et al. | 423/651 |
| 7,160,533 B2 | 1/2007 | Hagemeyer et al. | |
| 7,381,230 B2 * | 6/2008 | Rapier et al. | 48/61 |
| 7,498,095 B2 | 3/2009 | Finnerty et al. | |
| 7,517,374 B2 | 4/2009 | Nielsen et al. | |
| 7,560,496 B2 | 7/2009 | Kuhrs et al. | |
| 7,931,875 B2 * | 4/2011 | Tonkovich et al. | 422/211 |
| 8,124,289 B2 * | 2/2012 | Scotto | 429/429 |
| 8,177,868 B2 * | 5/2012 | Johnston | 48/61 |
| 2003/0153632 A1 | 8/2003 | Wang et al. | |
| 2003/0157380 A1 | 8/2003 | Assarabowski et al. | |
| 2003/0198592 A1 | 10/2003 | Allison et al. | |
| 2004/0171900 A1 * | 9/2004 | Wang et al. | 585/658 |
| 2005/0022450 A1 | 2/2005 | Tan et al. | |
| 2005/0268553 A1 | 12/2005 | Liu et al. | |
| 2006/0029539 A1 | 2/2006 | Dutta et al. | |
| 2006/0088459 A1 | 4/2006 | Upchurch et al. | |
| 2006/0194084 A1 | 8/2006 | Kim et al. | |
| 2006/0230680 A1 | 10/2006 | Rostrup-Nielsen et al. | |
| 2007/0042301 A1 | 2/2007 | Carroni et al. | |
| 2007/0249738 A1 * | 10/2007 | Haynes et al. | 518/702 |
| 2008/0031800 A1 | 2/2008 | Franz et al. | |
| 2008/0161428 A1 * | 7/2008 | Strait | 518/702 |
| 2008/0168774 A1 * | 7/2008 | Drnevich et al. | 60/777 |
| 2008/0226955 A1 * | 9/2008 | Scotto | 429/20 |

FOREIGN PATENT DOCUMENTS

| | | |
|---|---|---|
| EP | 0 208 929 A1 | 1/1987 |
| EP | 0 330 751 A2 | 9/1989 |
| EP | 0 396 650 B2 | 11/1990 |
| EP | 0 433 223 A1 | 6/1991 |
| EP | 0 504 937 A1 | 9/1992 |
| EP | 1 149 799 A1 | 10/2001 |
| EP | 1 413 547 A1 | 4/2004 |
| EP | 1 445 235 A2 | 8/2004 |
| FR | 2 899 022 A1 | 9/2007 |
| RU | 2 280 925 C2 | 7/2006 |
| WO | WO 98/55227 A1 | 12/1998 |
| WO | WO 01/43524 A2 | 6/2001 |
| WO | WO 01/51412 A1 | 7/2001 |
| WO | WO 2007/070260 A2 | 6/2007 |
| WO | WO 2007/105012 A1 | 9/2007 |
| WO | WO 2008/001119 A2 | 1/2008 |

* cited by examiner

GAS GENERATOR AND PROCESSES FOR THE CONVERSION OF A FUEL INTO AN OXYGEN-DEPLETED GAS AND/OR HYDROGEN-ENRICHED GAS

FIELD OF THE INVENTION

The present invention relates to a gas generator for converting a fuel into an oxygen-depleted gas (protection gas) and/or hydrogen-enriched gas (reducing gas). The gas generator, which may be used in any process requiring oxygen-depleted gas and/or hydrogen-enriched gas, is preferably used for generating protection gas or reducing gas for start up, shut down or emergency shut down of a solid oxide fuel cell (SOFC) or a solid oxide electrolysis cell (SOEC). The present invention further relates to processes for the conversion of fuels into an oxygen-depleted gas and/or a hydrogen-enriched gas.

In the present application, the term "oxygen-depleted gas" or "protection gas" means flue gas of a combustion process from which oxygen has been substantially removed. Thus, protection gas is mainly a mixture of steam (water vapor), nitrogen, and carbon dioxide. On the other hand, the term "hydrogen-enriched gas" or "reducing gas" means syngas from which carbon monoxide has been substantially removed. Thus, reducing gas is mainly a mixture of steam, nitrogen, hydrogen, and carbon dioxide.

BACKGROUND OF THE INVENTION

Fuel cells directly convert chemical energy of a fuel into electricity. Recent development is directed to improving the performance of SOFCs because these fuel cells are able to convert a wide variety of fuels with a high efficiency.

A single SOFC comprises a solid oxide dense electrolyte sandwiched between an anode (fuel electrode) and a cathode (oxygen electrode), said anode and cathode each having fine pores or channels for supplying the reactants. Upon passing an oxygen-containing gas such as air along the cathode, the oxygen molecules contact the cathode/electrolyte interface where they are electrochemically reduced to oxygen ions. These ions diffuse into the electrolyte material and migrate towards the anode where they electrochemically oxidize the fuel at the anode/electrolyte interface. The electrochemical reactions within the fuel cell provide electricity for an external circuit. The fuel cell may further comprise a support having fine pores or channels, which enable the controlled distribution of the fuel. A plurality of SOFCs may be connected in series via interconnects to form a so-called "SOFC stack".

A SOFC may be operated reverse, i.e., as an electrolysis cell (SOEC), which directly converts electricity into chemical energy of a fuel. For example, the electrochemical decomposition of steam leads to hydrogen and oxygen, or the electrochemical decomposition of carbon dioxide leads to carbon monoxide and oxygen. This means that the electrolysis of a mixture of steam and carbon dioxide leads to a mixture of hydrogen and carbon monoxide (syngas), which in turn can be converted into fuels such as methanol or dimethyl ether (DME) using well-known process technologies. SOECs have the potential of efficiently converting renewable energies such as wind energy, photovoltaic energy or hydropower. Recent developments are directed to reversible solid oxide cells (SOCs), which may be used both as SOFC and SOEC.

The anode and the cathode of a SOFC are made from materials having electrical conductivity but no ion conductivity, whereas the electrolyte thereof is made from a material having ion conductivity but no electrical conductivity.

Suitable materials for the cathode, the electrolyte, and the anode of a SOFC are known in the art (see, for example, U.S. Pat. No. 7,498,095 and WO-A-01/43524). A commonly used cathode material is lanthanum strontium manganite (LSM), a cermet such as yttria stabilized zirconia (YSZ), or a composite thereof. The anode material is generally a cermet such as YSZ. If hydrogen is used as the fuel it is electrochemically oxidized by the oxygen ions at the anode/electrolyte interface. In case a hydrocarbon such as methane is to be used as the fuel, a reforming catalyst such as nickel is added to the anode material. The catalyst assists in converting the fuel into hydrogen, known as internal reforming. The solid oxide electrolyte material is generally a ceramic material such as YSZ, which exhibits sufficient ion conductivity only at high temperatures. Therefore, a SOFC has to be operated at an elevated temperature (usually at least 300° C.) in order to achieve a high current density and power output.

An anode comprising a reforming catalyst is not resistant to oxygen while the SOFC is warmed up to above a certain temperature, i.e., about 200° C. Oxygen at elevated temperatures can damage the anode reforming catalyst due to low redox stability. Therefore, the SOFC stack must be protected against an oxidizing gas during start up and shut down.

WO-A-2008/001119 discloses the use of a blanket gas based on an inert gas during shut down of a SOFC stack. This publication further discloses the use of a catalytic partial oxidation reactor to produce reducing gas, which comprises carbon monoxide and hydrogen, in order to protect a SOFC stack against an oxidizing gas during start up and shut down.

One advantage of reducing gas is that only anode channels need to be purged while air on the cathode side can be used for heating up or cooling down during start up and shut down, respectively. Hydrogen can basically protect nickel particles of the anode surface to react with oxygen ions, which may be transferred from the cathode to the anode via the electrolyte.

However, reducing gas has two major drawbacks. First, hydrogen and carbon monoxide cannot be purged into the atmosphere. The catalytic burner of a SOFC system needs to be operated during start up and shut down of the fuel cell to burn the toxic and explosive gases. This may cause several difficulties regarding the process operability and safety.

Second, carbon monoxide at low temperatures (usually less than 300° C.) may react with nickel nano-particles on the anode surface and on the pre-reforming/reforming catalyst, which leads to the formation of nickel carbonyl ($Ni(CO)_4$; boiling point 43° C.). Nickel carbonyl is highly volatile and extremely toxic. Even a low concentration of this compound in the air can be fatal ($LC_{50}$=3 ppm). Moreover, nickel carbonyl may be thermally decomposed inside the catalytic burner, which leads to a deactivation of the catalyst.

On the other hand, protection gas can be easily purged into the atmosphere and has no interaction with catalyst and fuel cell materials. However, it cannot protect the reforming catalyst at the anode surface against oxygen ions, which may diffuse through the solid electrolyte from the cathode side. This problem is more serious at high temperatures close to the operating temperature of the fuel cell where the ion conductivity of the electrolyte is high.

Therefore, protection gas may be used when the SOFC stack temperature is below 300° C. while the catalytic burner may not be operating. Normally, above this temperature, the catalytic burner temperature in the system is beyond the minimum operating temperature; therefore, reducing gas can be used to protect the SOFC stack. Since the reducing gas has a low carbon monoxide content, there is less chance for carbon formation.

The above-described problems also arise during start up and shut down of a SOEC.

SUMMARY OF THE INVENTION

An object of the present invention is to provide a gas generator for converting a fuel into an oxygen-depleted gas and/or a hydrogen-enriched gas suitable for use in various applications.

Another object of the invention is to provide processes for the conversion of fuels into an oxygen-depleted gas and/or a hydrogen-enriched gas.

The present invention provides a gas generator for converting a fuel into an oxygen-depleted gas and/or hydrogen-enriched gas, which comprises the following units integrated within a reactor shell and arranged in series:
- a primary catalytic burner or a catalytic partial oxidation zone, followed by
- a secondary catalytic burner for carrying out combustion or catalytic partial oxidation,
- cooling devices for cooling the flue gases from the primary and/or secondary catalytic burners or from the catalytic partial oxidation zone,
- an oxygen absorber for absorbing oxygen from the flue gas of the secondary catalytic burner followed by
- a shift converter or a methanator for converting carbon monoxide in the flue gas from the secondary catalytic burner to carbon dioxide or methane.

The present invention is also directed to the use of said gas generator in a process requiring oxygen-depleted gas and/or hydrogen-enriched gas, and especially to the use of the gas generator for generating protection gas or reducing gas for start up, shut down or emergency shut down of a SOFC or SOEC.

An advantage of the gas generator according to the present invention is that there is no need for an external gas source or material for protecting a fuel cell stack during fuel cell system start up and shut down processes. The system fuel, which may be a gas or a liquid, is used to produce protection/reducing gas to either protect or reduce fuel cell stack and other pyrophoric components in the fuel cell system.

The present invention further provides a process for the conversion of a fuel into an oxygen-depleted gas and/or a hydrogen-enriched gas, the process comprising the steps of:
catalytically combusting a fuel in a primary catalytic burner with an oxygen-containing gas to produce a flue gas comprising oxygen, followed by
combusting or partially oxidising the flue gas comprising oxygen with excess fuel in a secondary catalytic burner to produce a gas comprising hydrogen and carbon monoxide, or a gas comprising traces of oxygen, and either
reducing the trace amounts of oxygen from the gas comprising traces of oxygen and obtaining an oxygen-depleted gas, or
reducing the amount of carbon monoxide present in the gas comprising hydrogen and carbon monoxide by catalytic conversion to carbon dioxide or methane to obtain a hydrogen-enriched gas.

Moreover, the present invention provides a process for the conversion of a fuel into an oxygen-depleted gas and/or a hydrogen-enriched gas, the process comprising the steps of:
catalytically partially oxidising a fuel in a primary catalytic burner with an oxygen-containing gas to produce a flue gas comprising carbon monoxide and hydrogen, followed by
combusting the flue gas comprising carbon monoxide and hydrogen in a secondary catalytic burner to produce a gas consisting of traces of oxygen, carbon dioxide, steam and inerts (including nitrogen and noble gases), or a gas comprising hydrogen and carbon monoxide, the amount of carbon monoxide present after combusting the flue gas in the secondary catalytic burner being reduced in comparison to the amount present before combusting the flue gas in the secondary catalytic burner, followed by either
reducing the amount of oxygen in the gas consisting of traces of oxygen, carbon dioxide, steam and inerts, and obtaining an oxygen-depleted gas, or
converting the carbon monoxide present in the gas comprising hydrogen and carbon monoxide to carbon dioxide or methane and obtaining a hydrogen-enriched gas.

Preferred embodiments of the present invention are set forth in the dependent claims.

DETAILED DESCRIPTION OF THE INVENTION

The gas generator and the processes for the conversion of fuels into an oxygen-depleted gas and/or a hydrogen-enriched gas in accordance with the present invention are described below in detail with reference to the figures.

The gas generator in accordance with the present invention comprises a primary catalytic burner or a catalytic partial oxidation zone; a secondary catalytic burner for carrying out combustion or catalytic partial oxidation; cooling devices for cooling the flue gases from the primary and/or secondary catalytic burners or from the catalytic partial oxidation zone; an oxygen absorber for absorbing oxygen from the flue gas of the secondary catalytic burner; and a shift converter or a methanator for converting carbon monoxide in the flue gas from the secondary catalytic burner to carbon dioxide or methane.

The primary catalytic burner or the catalytic partial oxidation zone, and the secondary catalytic burner comprise suitable combustion catalysts. Examples thereof include catalysts comprising, as active components, platinum, palladium, copper, manganese, and/or chromium, impregnated on a porous ceramic carrier in the form of a monolith or in the form of cylinders or spheres arranged in a fixed bed, described in EP-A-504937; catalysts including a metal oxide possessing more that one oxidation state (such as tin oxide, or manganese oxide), ruthenium, and at least one other noble metal selected from platinum, palladium, gold, rhodium, and silver, and at least one promoter selected from iron oxide, nickel oxide, cobalt oxide, and tungsten oxide, described in US-A-2006/88459; and catalysts comprising a carrier of alumina having distributed on the surface thereof at least one catalytic metal selected from platinum, palladium, rhodium, and iridium, preferably a combination of platinum and at least one of rhodium and iridium, described in U.S. Pat. No. 4,111,848. Examples of other catalytic materials suitable for use in the primary catalytic burner or the catalytic partial oxidation zone include palladium and platinum, optionally in combination with rhodium, iridium, osmium, or ruthenium. These catalytic materials may be supplemented with base metals such as chromium, copper, vanadium, cobalt, nickel, or iron. The catalytic materials may be supported on a monolithic carrier having a plurality of finely divided gas flow passages. The carrier material may be a ceramic porous material comprised of one or more metal oxides, such as alumina, alumina-silica, alumina-silica-titania, mullite, cordierite, zirconia, zirconia-spinel, zirconia-mullite, or silicon carbide. Such catalysts are disclosed in U.S. Pat. No. 4,522,894. Other suitable catalysts are described in U.S. Pat. No. 5,628,931, U.S. Pat. No. 6,110,861, and WO-A-98/55227. Examples of commercially available combustion catalysts include catalysts based on copper, manganese, aluminum, platinum, and palladium, available from Haldor Topsoe A/S.

The form of the catalysts for use in the present invention may be any suitable form. It may be a conventional fixed bed of catalyst pellets, a mesh, catalyzed hardware, or a structured catalyst.

In case of catalyzed hardware, a catalytic material is added directly to a metal surface. A thin layer of a slurry containing a ceramic precursor is applied on the metal surface by means of spraying, painting, dipping, or the like. After having applied the coat, the slurry is dried and calcined at a temperature usually ranging from 350° C. to 1000° C. Finally, the ceramic layer is impregnated with the catalytic material. Alternatively, the catalytically active material is applied simultaneously with the ceramic precursor. Catalyzed hardware for use in the present invention can be either a catalyst attached directly to a channel wall in which the process gas flows, or a catalyst attached to a metallic structured element forming a structured catalyst. The structured element serves to provide a support for the catalyst. Furthermore, catalyzed hardware can be used in the form of a catalyst deposited in a metallic or ceramic structure, which is adhered to a wall of the reactor, for example, in the form of a mesh.

Structured elements are devices comprising a plurality of layers with flow channels present between the adjoining layers. The layers are shaped in such a way that placing the adjoining layers together leads to an element in which the flow channels can, for example, cross each other or can form straight channels. Structured elements are further described in U.S. Pat. No. 5,536,699, U.S. Pat. No. 4,985,230, EP-0 396 650 A1 (U.S. Pat. No. 5,417,938), EP 0 433 223 A1, and EP 0 208 929 A1.

Two types of structured elements are particularly suitable for use in the present invention: straight-channeled elements and cross-corrugated elements. The straight-channeled elements require adiabatic conditions, and various geometries of these elements are possible. Cross-corrugated elements allow efficient heat transfer from the reactor wall to the gas stream. Other catalyzed structured elements can also be used in the present invention, such as high-surface structured elements.

Examples of structured catalysts include catalyzed monoliths, catalyzed cross-corrugated structures, and catalyzed rings (such as pall-rings). Both with catalyzed hardware applied directly to the wall of the reactor and with structured catalysts, the amount of catalyst can be tailored to the required catalytic activity for the process reactions at given operating conditions. In this manner, the pressure drop is lower, and the amount of catalyst is not more than needed, which is especially advantageous when costly noble metals are used.

A thermal burner may be located upstream the primary catalytic burner or the catalytic partial oxidation zone. The thermal burner may be utilized to heat up the catalyst to the operation temperature during the start up phase. The thermal burner may comprise a fuel igniting device, which may be a spark plug, an electric filament, or an electrical heater. The selection of an appropriate igniting device depends on the auto-ignition temperature of the fuel.

The secondary catalytic burner may be heated up to the operation temperature by thermally igniting a fuel with an oxygen-containing gas under flame reactions.

The gas generator further comprises cooling devices for cooling the flue gases from the primary and/or secondary catalytic burners or from the catalytic partial oxidation zone.

The temperature of the flue gas of the primary catalytic burner or the catalytic partial oxidation zone, and the temperature of the flue gas of the secondary catalytic burner may reach up to 1000° C. Therefore, the flue gases are at least partially cooled down with a cooling device to a temperature, which is appropriate for the next step. The cooling device may be a forced-convection type cooler or a free-convection type heat exchanger. For example, it may have gas manifolds for air forced convection cooling, or may have open channels or finned tubes for natural convection cooling.

The catalysts and the cooling devices of the gas generator may be integrated as catalyst-coated cooling devices such as catalyst-coated heat exchangers.

The oxygen absorber for absorbing oxygen from the flue gas of the secondary catalytic burner contains a suitable high-temperature resistant material for removing oxygen from the flue gas. Different oxygen high-temperature sorbents may be used. The oxygen sorbents may be in the form of a packed bed or in the form of a monolith. Suitable sorbents comprise ultrafine iron powders, and oxygen-deficient perovskite-type ceramics. Examples of the perovskite-type ceramic materials include strontium-iron doped lanthanum cobaltites having the general formula $La_{1-x}Sr_xCO_{1-y}Fe_yO_{3-\delta}$, wherein x ranges from 0.2 to 0.95, preferably from 0.5 to 0.9; y ranges from 0 to 1, preferably from 0.05 to 0.6; and $\delta$ is the oxygen deficiency (oxygen nonstoichiometry) and preferably ranges from more than 0 to about 0.5. Specific examples thereof are $La_{0.1}Sr_{0.9}CO_{0.5}Fe_{0.5}O_{3-\delta}$ and $La_{0.1}Sr_{0.9}CO_{0.9}Fe_{0.1}O_{3-\delta}$. These materials reversibly absorb oxygen and can be regenerated with a hydrogen-containing gas at elevated temperatures. The sorbents may be supported on a high-temperature resistant carrier such as alumina. The operating temperature of the oxygen absorber may range from more than 200° C. to less than 600° C. Sorbents based on ultrafine iron powders are generally used at lower temperatures, whereas perovskite-type sorbents are generally used at higher temperatures. Suitable sorbents are described in Ind. Eng. Chem. Res. 2002, 41, 2775-2784; Ind. Eng. Chem. Res. 2002, 41, 4837-4840; Ind. Eng. Chem. Res. 2003, 42, 4376-4381; and AIChE Journal, February 2006, Vol. 52, No. 2, 574-581. The sorbents may be regenerated with a reducing gas such as syngas.

The shift converter may contain any suitable shift catalyst. A catalyst in the monolith form is preferably used because the pressure drop and the size of the bed can be reduced. Examples of the shift catalysts suitable for use in the present invention include the iron-chromium based catalysts, copper-zinc-aluminum based catalysts, and noble metal based catalysts, described in WO-A-2007/70260; the copper-zinc-aluminum oxides, copper-zinc-chromium oxides, and iron-chromium oxides, available from Haldor Topsoe A/S, described in US-A-2006/230680; the manganese-zirconium based shift catalysts, available from Haldor Topsoe A/S, described in EP-A-1445235; the copper-zinc-aluminum based catalysts, and copper-zinc-chromium catalysts, available from Haldor Topsoe A/S, described in U.S. Pat. No. 7,517,374; the shift catalysts comprising magnesium, manganese, aluminum, zirconium, lanthanum, cerium, praseodymium, and/or neodymium, available from Haldor Topsoe A/S, described in EP-A-1149799. Examples of other suitable shift catalysts include the noble metal based shift catalysts described in U.S. Pat. No. 7,160,533, containing platinum and/or an oxide thereof, ruthenium and/or an oxide thereof, and at least one member selected from the group consisting of alkali metals, alkaline earth metals, scandium, yttrium, titanium, zirconium, vanadium, molybdenum, manganese, iron, cobalt, rhodium, iridium, germanium, tin, antimony, lanthanum, cerium, praseodymium, samarium, and europium, oxides thereof, and mixtures thereof; and the shift catalysts including platinum, palladium, rhodium, ruthenium, nickel, iridium, cobalt, copper, gold, iron, silver, oxides thereof, as well as combinations thereof, described in US-A-2005/22450.

The methanator may contain a conventional methanation catalyst. Examples of suitable catalysts and methanation conditions are described in U.S. Pat. No. 7,560,496. Preferred methanation catalysts include ruthenium, nickel, or a combination thereof. An example of a commercially available catalyst is PK-7R available from Haldor Topsoe A/S.

Preferred embodiments of operating the gas generator according to the present invention are given below.

First Mode of Operating the Gas Generator

Figure 1:
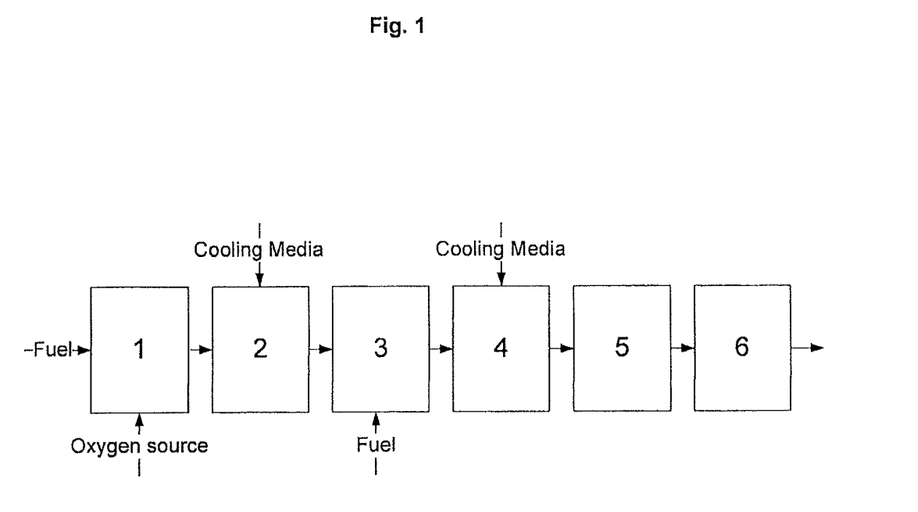
FIG. 1 is a schematic drawing illustrating one mode of operating the gas generator in accordance with the present invention.

A first mode of operating the gas generator in accordance with the present invention is shown in FIG. 1.

In a first step, a fuel is catalytically combusted with an oxygen-containing gas in the primary catalytic burner to produce a flue gas comprising oxygen. In this mode the oxygen-containing gas is introduced into the primary catalytic burner is used in excess relative to the fuel ($\lambda > 1$). It is preferred that the combustion in the primary catalytic burner is carried out with a super-stoichiometric amount of air. In a preferred embodiment in combination with any of the above or below embodiments $\lambda$ ranges from 1 to 10 and more preferably from 2 to 6, and is most preferably about 3.

The catalyst materials suitable for use in the primary catalytic burner have been described above.

Examples of suitable fuels are hydrocarbon fuels such as natural gas, biogas, ethane, propane, butane, as well as liquids such as alcohols (for example, methanol or ethanol), DME, and petroleum-based fuels such as liquefied petroleum gas (LPG), diesel, kerosene or naphtha.

Examples of the oxygen-containing gases are air, oxygen, oxygen diluted with an inert gas, and an air/steam mixture, with air being preferred.

The general combustion reaction in the primary catalytic burner is:

$$C_nH_{2n+2} + [(3n+1)/2]O_2 \rightarrow nCO_2 + (n+1)H_2O$$

Wherein n is an integer of at least 1.

In case natural gas and air are used as the feed for the primary catalytic burner, the flue gas of the primary catalytic burner contains oxygen, nitrogen, carbon dioxide, steam, and balanced other inert gases. The flue gas may then be cooled with a suitable cooling device in a second step before it is introduced into the secondary catalytic burner.

In a third step, additional fuel is added, which is combusted or partially oxidized with the obtained flue gas comprising oxygen in the secondary catalytic burner.

The catalyst materials suitable for use in the secondary catalytic burner have been described above. The secondary catalytic burner can also act as a catalytic partial oxidation net when the air/fuel ratio is lower than one.

The catalyst used in the secondary catalytic burner has a dual functionality. At O/C ratios higher than the stoichiometric value required for a complete combustion, it acts as a combustion catalyst; whereas at O/C ratios lower than the stoichiometric value required for a complete combustion, it converts the excess fuel to syngas.

Protection Gas Generation

For protection gas generation, the additional fuel is added in the third step in a proportion so that the excess air drops down to slightly higher that zero. The amount of excess air may be up to 10%, preferably up to 5%, more preferably up to 2%, and most preferably up to 1%.

In the protection gas mode, the general combustion reaction in the secondary catalytic burner is:

$$C_nH_{2n+2} + [(3n+1)/2]O_2 \rightarrow nCO_2 + (n+1)H_2O$$

Wherein n is an integer of at least 1.

The flue gas of the secondary catalytic burner, which contains nitrogen, carbon dioxide, steam, traces of oxygen, as well as balanced other inert gases, may then be cooled with a suitable cooling device in a fourth step before it is introduced into the oxygen absorber where trace amounts of oxygen are removed in the fifth step.

The obtained protection gas (oxygen-depleted gas), which is mainly a mixture of steam, nitrogen, and carbon dioxide, then passes the shift converter or the methanator in the sixth step without reaction.

Reducing Gas Generation

For reducing gas generation, the additional fuel is added in the third step in a proportion so that the O/C ratio is less than the stoichiometric value required for a complete combustion. In a preferred embodiment in combination with any of the above or below embodiments $\lambda$ ranges from 0.1 to less than 1.0 and more preferably from 0.3 to 0.9, and is most preferably about 0.6.

In the reducing gas mode, the additional fuel is partially oxidized. The catalytic partial oxidation reaction in the secondary catalytic burner is mainly:

$$C_nH_{2n+2} + (n/2)O_2 \rightarrow nCO + (n+1)H_2$$

Wherein n is an integer of at least 1.

The flue gas of the secondary catalytic burner, which contains hydrogen and carbon monoxide, as well as nitrogen, carbon dioxide, steam, and balanced other inert gases, may then be cooled with a suitable cooling device in a fourth step before it is passed through the oxygen absorber in the fifth step where it regenerates the sorbent of the oxygen absorber.

The gas mixture from the oxygen absorber is introduced into the shift converter for converting carbon monoxide into carbon dioxide, or into the methanator for converting carbon monoxide into methane.

In the shift converter the carbon monoxide is converted to carbon dioxide according to the following reaction:

$$CO + H_2O \leftrightarrow CO_2 + H_2$$

In the methanator the carbon monoxide is converted to methane according to the following reaction:

The produced reducing gas (hydrogen-enriched gas) leaving the shift converter or the methanator is mainly a mixture of steam, nitrogen, hydrogen, carbon dioxide, and balanced other inert gases.

Second Mode of Operating the Gas Generator

Figure 2:
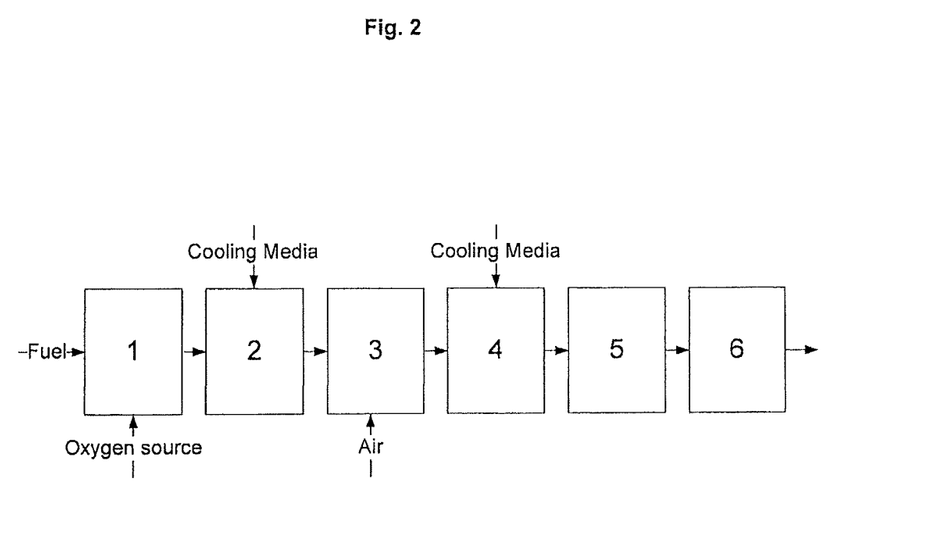
FIG. 2 is a schematic drawing illustrating another mode of operating the gas generator in accordance with the present invention.

A second mode of operating the gas generator in accordance with the present invention is shown in FIG. 2.

In a first step, a fuel is partially oxidized with an oxygen-containing gas in the primary catalytic burner to produce a flue gas comprising carbon monoxide and hydrogen. In this mode the fuel introduced into the primary catalytic burner is used in excess relative to the oxygen-containing gas. In a preferred embodiment in combination with any of the above or below embodiments λ ranges from 0.1 to less than 1.0 and more preferably from 0.3 to 0.9, and is most preferably about 0.6.

Examples of catalyst materials suitable for use in the primary catalytic burner, as well as examples of suitable fuels and oxygen-containing gases have been described above.

In case natural gas and air are used as the feed for the primary catalytic burner, the flue gas of the primary catalytic burner contains hydrogen and carbon monoxide, as well as carbon dioxide, steam, nitrogen, and balanced other inert gases. The flue gas may then be cooled with a suitable cooling device in a second step before it is introduced into the secondary catalytic burner.

In a third step, additional air is added for combusting the flue gas comprising carbon monoxide and hydrogen in the secondary catalytic burner.

The catalyst materials suitable for use in the secondary catalytic burner have been described above.

Protection Gas Generation

For protection gas generation, the additional air is added in the third step in a proportion so that the combustion of the flue gas of the primary catalytic burner containing hydrogen and carbon monoxide is substantially complete. In a preferred embodiment in combination with any of the above or below embodiments λ ranges from 1 to 1.5 and is more preferably about 1.1 (λ in reference to hydrogen and carbon monoxide).

The flue gas of the secondary catalytic burner, which consists of traces of oxygen, carbon dioxide, steam, and inert gases (including nitrogen and noble gases), may then be cooled with a suitable cooling device in a fourth step before it is introduced into the oxygen absorber where trace amounts of oxygen are removed in the fifth step.

The obtained protection gas (oxygen-depleted gas), which is mainly a mixture of steam, nitrogen, and carbon dioxide, then passes the shift converter or the methanator in the sixth step without reaction.

Reducing Gas Generation

For reducing gas generation, the additional air is added in the third step in a sub-stoichiometric amount for carrying out partial combustion of the flue gas of the primary catalytic burner containing hydrogen and carbon monoxide. In a preferred embodiment in combination with any of the above or below embodiments λ ranges from 0.1 to 0.7 and more preferably from 0.2 to 0.5, and is most preferably about 0.3.

The flue gas of the secondary catalytic burner, which contains hydrogen and carbon monoxide, as well as nitrogen, carbon dioxide, steam, and balanced other inert gases, may then be cooled with a suitable cooling device in a fourth step before it is passed through the oxygen absorber in the fifth step where it regenerates the sorbent of the oxygen absorber.

The gas mixture from the oxygen absorber is introduced into the shift converter for converting carbon monoxide into carbon dioxide, or into the methanator for converting carbon monoxide into methane.

The produced reducing gas (hydrogen-enriched gas) leaving the shift converter or the methanator is mainly a mixture of steam, nitrogen, hydrogen, carbon dioxide, and balanced other inert gases.

Figure 3:
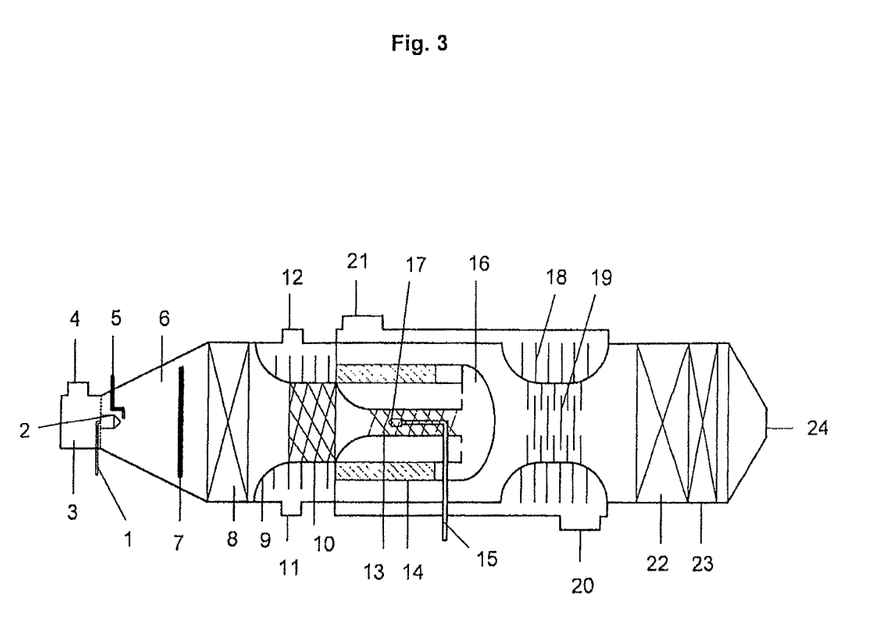
FIG. 3 is a schematic drawing illustrating a specific embodiment of the gas generator in accordance with the present invention.

FIG. 3 is a schematic drawing illustrating a specific embodiment of the gas generator operated in accordance with the first mode.

The protection/reducing gas generator shown in FIG. 3 comprises means for introducing a fuel (1), and an oxygen-containing gas (4). The fuel (1) is injected via a gas nozzle (2) into the fuel combustion chamber (6) where it is mixed with air (4) used as an oxygen-containing gas passing the air distributor (3). The mixture is ignited with an appropriate igniting device (5), which may be a spark plug, an electric filament, or an electrical heater. Excess air, equivalent to an adiabatic flame temperature below 1200° C., is used for the combustion. A flame shield (7) may be provided to divide the combustion chamber (6) from the downstream components and protect them.

When the primary catalytic burner (8) has been warmed up to above a certain temperature (for example, about 580° C. for natural gas), the gas nozzle (2) is closed for a few seconds to put out the flame in the combustion chamber (6). During this period, air is flown to cool down the combustion chamber (6) below the fuel auto-ignition temperature. The combustion is switched from the combustion chamber (6) to the primary catalytic burner (8) in which the fuel is burnt with excess air.

The flue gas of the primary catalytic burner (8) contains oxygen, nitrogen, carbon dioxide, steam, and balanced other inert gases.

The temperature of the flue gas of the primary catalytic burner (8) may reach up to 1000° C. Therefore, the flue gas is at least partially cooled down with a cooling device (9) to an appropriate temperature (for example, below 600° C.). The cooling device (9) may be a forced-convection type cooler or a free-convection type heat exchanger. For example, it may have gas manifolds for air forced convection cooling, or may have open channels or finned tubes for natural convection cooling. FIG. 3 shows a cooling device (9), which is a baffled flue gas cooler into which cooling air (11) is introduced via the finned channels (10). The warmed-up cooling air (11) is removed via the port (12).

The oxygen contained in the flue gas is then burnt with additional fuel (15) in the secondary catalytic burner (14).

The additional fuel (15) may be supplied via a gas nozzle (17) and may be mixed with the cooled flue gas in a mixing zone (13). The obtained mixture is then passed through a fuel injection channel (16) into the secondary catalytic burner (14). Alternatively, in case the catalyst of the secondary catalytic burner (15) is in the form of a fixed bed, the additional fuel may be added above the fixed bed. The fuel addition may be regulated by a mass flow controller, a dosing pump, a solenoid valve, or a control valve. The selection of an appropriate regulating device depends on the capacity of the protection/reducing gas production.

Protection Gas Generation

For protection gas generation, the additional fuel (15) is added in a proportion so that the excess air drops down to slightly higher that zero.

The flue gas of the secondary catalytic burner (14) contains nitrogen, carbon dioxide, steam, trace amounts of oxygen, and balanced other inert gases.

The temperature of the flue gas of the secondary catalytic burner (14) may reach up to 1000° C. For removing trace amounts of oxygen, the flue gas has to be cooled down to a temperature below 600° C. The flue gas cooler may be a forced-convection type cooler or a free-convection type heat exchanger. For example, it may have gas manifolds for air forced convection cooling, or may have open channels or finned tubes for natural convection cooling. FIG. 3 shows a cooling device (19) where cooling air (20) is passed through the finned channels (18). The warmed-up cooling air (20) is removed via the outlet (24).

The cooled flue gas having a temperature of less than 600° C. is passed through the oxygen absorber (22) where trace amounts of oxygen are removed.

The produced protection gas being mainly a mixture of steam, nitrogen, and carbon dioxide passes the carbon monoxide converter (23) without any reaction, and then exits the gas generator through the outlet (24).

Reducing Gas Generation

For reducing gas generation, the additional fuel (15) is added in a proportion so that the O/C ratio is less than the stoichiometric value required for a complete combustion. This must be done only when the carbon monoxide converter (23) is at a high temperature (above 300° C.).

The flue gas of the secondary catalytic burner (14) contains nitrogen, carbon dioxide, steam, hydrogen, carbon monoxide, and balanced other inert gases.

The produced syngas is passed through the oxygen absorber (22) where it regenerates the sorbent. Subsequently, the gas is passed through the carbon monoxide converter (24) where carbon monoxide is converted into carbon dioxide or methane.

The produced reducing gas, which is mainly a mixture of steam, nitrogen, hydrogen, carbon dioxide, and balanced other inert gases, then exits the gas generator via the outlet (24).

Example

Figure 4:
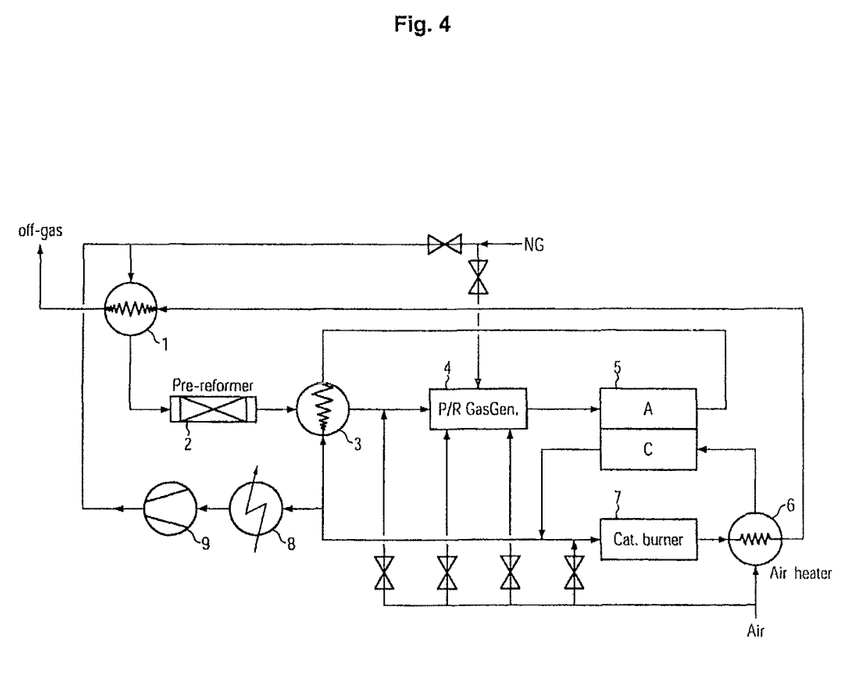
FIG. 4 shows a typical system configuration of a natural gas-based SOFC system where the gas generator is integrated.

With reference to FIG. 4, an example of a typical system configuration of a natural gas (NG)-based SOFC system where the protection/reducing gas generator is integrated is given.

The gas generator according to the present invention is applicable for SOFC systems having an output of from few hundred watts to few hundred kilowatts.

The catalysts of the primary catalytic burner (8) and the secondary catalytic burner (14) used in the example are based on palladium. Protection gas is used to heat up the SOFC stack up to about 300° C., whereas reducing gas is utilized to heat up the stack further up to the operating temperature, i.e., about 650° C. to 800° C. The carbon monoxide converter (24) used in the example is a shift converter.

The system shown in FIG. 4 comprises a pre-reformer feed heater (1); a pre-reformer (2), which converts higher hydrocarbons contained in the natural gas into methane; an anode gas heater (3); the protection/reducing gas generator (4); the SOFC stack (5); a cathode air heater (6); a catalytic burner (7), which burns toxic and explosive gases contained in the stack anode off gas; a recycle anode gas cooler (8); and an anode gas recycle blower (9).

The pre-reformer (2), which acts as a methane generator, contains a conventional pre-reforming catalyst such as a nickel-based catalyst, and/or a catalyst based on noble metals such as platinum or rhodium. An example of a pre-reformer suitable for use in the present invention is described in EP-A-1413547.

The catalytic burner (7) contains a conventional oxidation catalyst optionally supported on a suitable carrier. Examples of the oxidation catalysts include noble metals such as platinum, palladium, ruthenium, rhodium, iridium, gold, and silver, as well as compounds, alloys, and mixtures thereof. Examples of the carriers comprise porous materials such as aluminum oxide, stabilized aluminum oxide, zirconium oxide, yttrium oxide, lanthanum oxide, cerium oxide, scandium oxide, and combinations thereof. The previously described noble metal catalysts suitable for use in the primary and secondary catalytic burners (8) and (15) may also be used in the catalytic burner (7).

System Start Up

The protection/reducing gas generator (4) and the catalytic burner (7) are started up. For start up, the protection/reducing gas generator (4) generates protection gas. The anode gas is recycled to accumulate steam in the closed loop [(5), (3), (8), (9), (1), (2), (4), (5); see FIG. 4] while the cathode air is warmed up and used to heat up the SOFC stack (5) up to about 300° C. Meanwhile, the pre-reformer (2) is protected with a mixture of natural gas and protection gas while it is warmed up gradually.

A typical natural gas (89% methane, 6% ethane, 3% propane, 0.5% butane, 1.5% inert gas) is used as the fuel, and air is used as the oxygen-containing reactant.

In the primary catalytic burner (8), an air/fuel volumetric ratio of 17.8 (O/C=6.5) is adjusted, whereas additional fuel is added in the secondary catalytic burner (15) to bring the overall O/C ratio down to 3.9.

Under the above conditions, protection gas with a molar composition of 69% nitrogen, 19% steam, 9% carbon dioxide, and balanced other inert gases is obtained at about 1000° C.

When the temperature of the SOFC stack (5) is above 300° C., the protection/reducing gas generator (4) is switched to reducing gas mode. This is accomplished by introducing more fuel into the secondary catalytic burner (14) so that the O/C ratio drops below the stoichiometric value required for a complete combustion. By lowering the O/C ratio to about 3, syngas having a molar composition of 65% nitrogen, 7.5% carbon dioxide, 16.5% steam, 5.5% hydrogen, 4% carbon monoxide, and balanced other inert gases, and having a temperature of about 1000° C. is obtained. The gas is then cooled to less than 600° C. The cooled syngas passes the oxygen absorber (22) where it regenerates the sorbent. In the subsequent shift converter (23), the carbon monoxide is converted into carbon dioxide.

Reducing gas with a molar composition of 65% nitrogen, 11% carbon dioxide, 13% steam, 9% hydrogen, 0.5% carbon monoxide, and balanced other inert gases is obtained at 440° C. after passing the shift converter (24).

Having the reducing atmosphere inside the SOFC stack (5) and the pre-reformer (2), the stack is warmed up to about 650° C.

System Shut Down

The protection/reducing gas generator (4) is started up by introducing air and excess fuel into it to produce syngas. The SOFC stack (5) is cooled down to about 400° C. and the catalytic burner (7) is shut down. The extra fuel to the protection/reducing gas generator (4) is cut for protection gas generation. The SOFC stack (5) and the pre-reformer (2) are further cooled down to below 150° C., and then the fuel and air supply to the protection/reducing gas generator (4) is shut off.

What is claimed is:

1. A process for the conversion of a fuel into an oxygen-depleted gas and/or a hydrogen-enriched gas, the process comprising the steps of:
   catalytically combusting a fuel in a primary catalytic burner with an oxygen-containing gas to produce a flue gas comprising oxygen;
   followed by combusting or partially oxidising the flue gas comprising oxygen with excess fuel in a secondary catalytic burner to produce a gas comprising hydrogen and carbon monoxide, or a gas comprising traces of oxygen; and
   either:
   reducing the trace amounts of oxygen from the gas comprising traces of oxygen and obtaining an oxygen-depleted gas, or
   reducing the amount of carbon monoxide present in the gas comprising hydrogen and carbon monoxide by catalytic conversion to carbon dioxide or methane to obtain a hydrogen-enriched gas; and wherein the primary and secondary catalytic burners are heated up to operation temperature by thermally igniting a fuel with an oxygen-containing gas under flame reactions.

2. The process of claim 1, wherein the flue gas comprising oxygen and/or the gas comprising hydrogen and carbon monoxide or the gas comprising traces of oxygen are cooled before the next step.

3. The process of claim 1, wherein the combustion in the primary catalytic burner is carried out with a super stoichiometric amount of air.

* * * * *